(12) United States Patent
Hoffman

(10) Patent No.: US 12,124,324 B1
(45) Date of Patent: Oct. 22, 2024

(54) SYSTEM AND METHOD FOR IDENTIFYING RESOURCE ACCESS FAULTS BASED ON WEBPAGE ASSESSMENT

(71) Applicant: Splunk Inc., San Francisco, CA (US)

(72) Inventor: William Matthew Hoffman, Roswell, GA (US)

(73) Assignee: Splunk Inc., San Francisco, CA (US)

( * ) Notice: Subject to any disclaimer, the term of this patent is extended or adjusted under 35 U.S.C. 154(b) by 19 days.

(21) Appl. No.: 17/230,138

(22) Filed: Apr. 14, 2021

(51) Int. Cl.
*G06F 9/44* (2018.01)
*G06F 11/07* (2006.01)
*G06F 11/36* (2006.01)

(52) U.S. Cl.
CPC ........ *G06F 11/079* (2013.01); *G06F 11/0706* (2013.01); *G06F 11/076* (2013.01); *G06F 11/0772* (2013.01); *G06F 11/3612* (2013.01)

(58) Field of Classification Search
CPC ... G06F 11/3612; G06F 11/079; G06F 11/076
See application file for complete search history.

(56) References Cited

U.S. PATENT DOCUMENTS

| | | | |
|---|---|---|---|
| 6,658,463 B1 | 12/2003 | Dillon et al. | |
| 7,774,782 B1 * | 8/2010 | Popescu | H04L 67/02 709/202 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 11,716,405 B1 | 8/2023 | Hoffman | |
| 2003/0084143 A1 * | 5/2003 | Knoesel | H04L 61/30 709/239 |

(Continued)

FOREIGN PATENT DOCUMENTS

EP 2892207 7/2015

OTHER PUBLICATIONS

Hoffman, TBD, Systems and Method for Indentifying Cache Miss in Backend Application, Apr. 14, 2021.

(Continued)

*Primary Examiner* — Hang Pan
(74) *Attorney, Agent, or Firm* — Knobbe, Martens, Olson & Bear, LLP

(57) ABSTRACT

A method for identifying and indicating resource access faults associated with a webpage. The method includes receiving a machine-readable file that includes a plurality of instructions defining at least content and structure of a webpage. The method further comprises causing a browser to load the webpage based at least in part on the machine-readable file; determining resource utilization associated with the load of the webpage; identifying one or more resource access faults associated with the machine-readable file based at least in part on the determined resource utilization and a resource access instruction policy; for each of the one or more resource access faults, identifying an instruction of the plurality of instructions that corresponds to the particular resource access fault; and causing display of the one or more instructions.

20 Claims, 4 Drawing Sheets

(56) References Cited

U.S. PATENT DOCUMENTS

| | | | |
|---|---|---|---|
| 2003/0149567 A1* | 8/2003 | Schmitz | G06F 16/958 |
| | | | 707/E17.116 |
| 2007/0245409 A1 | 10/2007 | Harris et al. | |
| 2007/0299869 A1 | 12/2007 | Clary et al. | |
| 2008/0209030 A1* | 8/2008 | Goldszmidt | H04L 43/091 |
| | | | 709/224 |
| 2011/0055314 A1* | 3/2011 | Rosenstein | G06F 16/957 |
| | | | 715/846 |
| 2012/0221932 A1* | 8/2012 | Gleadall | H04L 67/02 |
| | | | 715/208 |
| 2016/0306894 A1* | 10/2016 | Liang | G06F 40/14 |
| 2018/0278688 A1 | 9/2018 | Gal et al. | |
| 2019/0098106 A1 | 3/2019 | Mungel et al. | |
| 2019/0227936 A1 | 7/2019 | Jang | |
| 2021/0133272 A1* | 5/2021 | Shribman | H04L 1/00 |

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

SLAML 10 Reports, Workshop On Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

U.S. Appl. No. 17/230,131, filed Apr. 14, 2021 to Hoffman.

* cited by examiner

```
<!DOCTYPE html>
<html lang="en" dir="ltr" prefix="og: http://ogp.me/ns#">
<head>
5. <script src="https://cdn.kie.org/otSb.js"type="a10-text/javascript"charset='UTF-8'>
   <script type="a10-text/javascript">
   fuction optanonwrapper() { window.datalayer.push({'event': 'onetrustGroupUpdated'});}
   <script>

10. <script type="a10-text/javascript">
    window.datalayer = window.datalayer || [];
    window.datalayer.push({
      event: 'dataLoaded',
      user: { },
15.   page: {
        type: 'landing_page',
        languge: 'EN-US',
        published: '2019-09-30',
20.     update: '2020-12-03',
      }
    });
    </script>

25. <link rel='preconnect' href='//cdn.dynamicyield.com' />
    <link rel='preconnect' href='//st.dynamicyield.com' />
    ┌─────────────────────────────────────────────────────┐
    │<link rel='preconnect' href='//rcom.dynamicyield.com' />│
    └─────────────────────────────────────────────────────┘
    <link rel='dns-prefetch' href='//cdn.dynamicyield.com' />
    <link rel='dns-prefetch' href='//st.dynamicyield.com' />
30. <link rel='dns-prefetch' href='//rcom.dynamicyield.com' />
    <script type="a10-text/javascript">
    window.DY= window.DY || {};
    DY.recommendationContext = { type: 'HOMEPAGE', data:['HOMEPAGE']};
    </script>
35. <script src='//cdn.dynamicyield.com/api/api_dynamic.js' type="a10-text/javascript"></script>
    <script src='//cdn.dynamicyield.com/api/api_static.js' type="a10-text/javascript"></script>
```

FIG. 3

| | | | |
|---|---|---|---|
| 23 GET jquery.hoverIntent.min.js | 200 | 1.2 KB | 1.4 KB | 119.30ms |
| 24 GET jquery.cookie.js | 200 | 1.7 KB | 2.7 KB | 46.00ms |
| 25 GET jquery.touchSwipe.min.js | 200 | 4.1 KB | 10.4 KB | 44.50ms |
| 26 GET css?family=Montserrat:400,500,700 | 200 | 1.1 KB | 5.5 KB | 153.60ms |
| 27 GET fb_like_refresher.js | 200 | 879 B | 696 B | 42.50ms |
| 28 GET plugins.js | 200 | 806 B | 604 B | 42.40ms |

FIG. 4A

| | | | |
|---|---|---|---|
| 23 GET jquery.hoverIntent.min.js | 200 | 1.2 KB | 1.4 KB | 119.30ms |
| 24 GET jquery.cookie.js | 200 | 1.7 KB | 2.7 KB | 46.00ms |
| 25 GET jquery.touchSwipe.min.js | 200 | 4.1 KB | 10.4 KB | 44.50ms |
| 26 GET css?family=Montserrat:400,500,700 | 200 | 1.1 KB | 5.5 KB | 153.60ms |
| 27 GET fb_like_refresher.js | 200 | 879 B | 696 B | 42.50ms |
| 28 GET plugins.js | 200 | 806 B | 604 B | 42.40ms |

FIG. 4B

SYSTEM AND METHOD FOR IDENTIFYING RESOURCE ACCESS FAULTS BASED ON WEBPAGE ASSESSMENT

CROSS-REFERENCES TO RELATED APPLICATIONS

This application is being filed on Apr. 14, 2021 concurrently with the following U.S. Patent Applications, each of which is incorporated by reference herein in its entirety:

| Attorney Docket No. | Patent Application Title | Filing Date | Application No. |
| --- | --- | --- | --- |
| SPLK.090A | System And Method For Identifying Cache Miss in Backend Application | Apr. 14, 2021 | 17/230131 |

FIELD

Various embodiments of the disclosure relate to improving webpage loading time. More specifically, various embodiments of the disclosure relate to identifying, indicating, and/or resolving resource access faults associated with a webpage.

BACKGROUND

Web performance is important for accessibility and also for other website metrics that serve the goals of an organization or business. Good or bad website performance correlates powerfully to user experience, as well as the overall effectiveness of most sites.

BRIEF DESCRIPTION OF THE DRAWINGS

The present disclosure is illustrated by way of example, and not limitation, in the figures of the accompanying drawings, in which like reference numerals indicate similar elements and in which:

FIG. 3 illustrates an example indication of instructions that correspond to a resource access fault identified by the recommendation system of FIG. 1.

FIGS. 4A and 4B illustrate portions of example waterfall diagrams.

DETAILED DESCRIPTION

Figure 1:
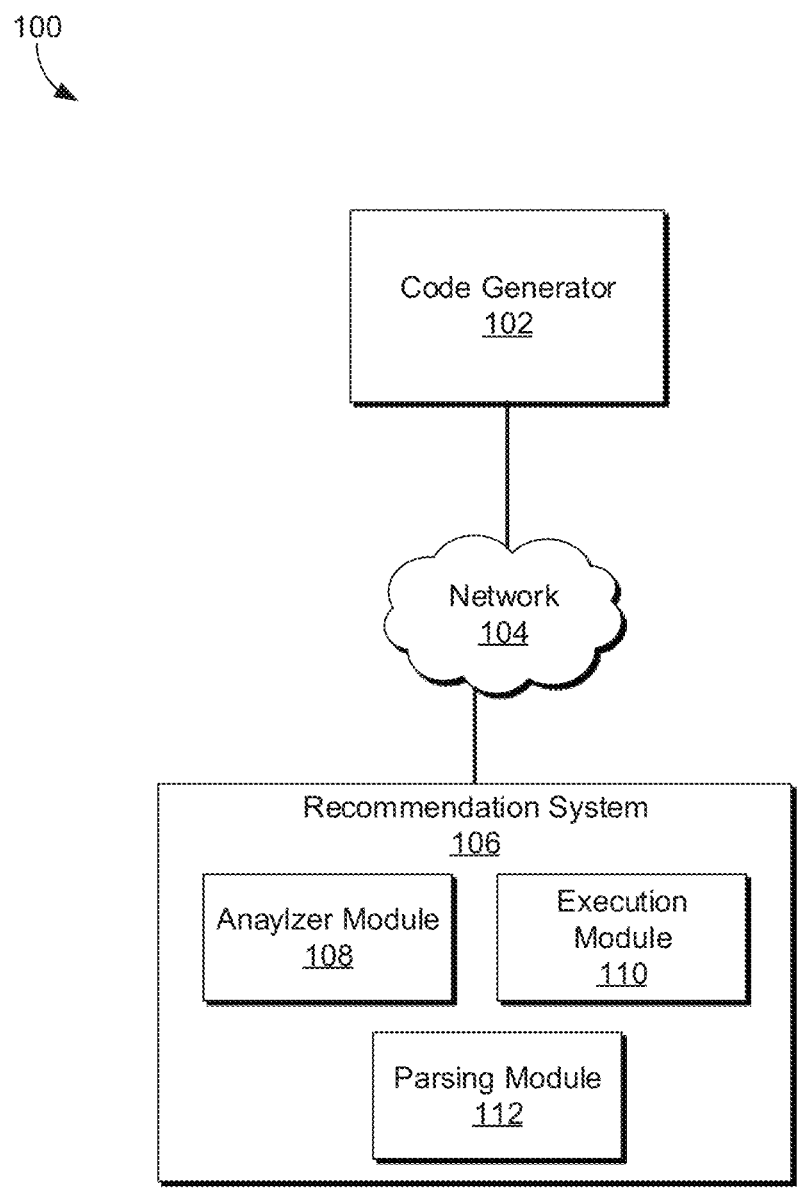
FIG. 1 illustrates an embodiment of an environment for improving webpage load performance.

Web performance generally refers to the speed at which webpages are downloaded and displayed on a web browser. An ever-increasing expectation for performance of websites has resulted in a mixed acceptance of a variety of webpage optimization strategies. Despite the importance of webpage performance, webpage loading is still relatively slow and inefficient.

To address these or other challenges, a recommendation system can be implemented to audit websites and web applications against a resource access instruction policy to identify specific portions in the website code that can be improved. The recommendation system can point out the identified faults in the website code and provide instructions as to how to improve the website performance. Furthermore, the recommendation system can create and communicate a modified version of the website code (or the code used to create the website code) that would resolve the identified performance issue. By identifying particular portions in the webpage code that are associated with web performance issues and providing guidance for making modifications to resolve the web performance issues, the recommendation system can improve the webpage performance and the overall effectiveness of a webpage.

Resource Access Instructions

When loading a webpage, browsers download the base HTML file and then download additional resources like CSS, JavaScript, or fonts, typically in the order they are discovered. Browsers are smart and tend to prioritize what to download and when to download it based on the type of content. For example, the browser will generally download primary content, such as a CSS file or a blocking JavaScript file before it downloads secondary content, such as a hero image.

However, during a webpage load, some resources are discovered only after other resources are downloaded first. For example, font files or background images may be discovered once the browser has downloaded and parsed the CSS file that references them. As another example, resources that are requested dynamically by JavaScript cannot be discovered until the request is made. When the browser does discover these resources, it will request them when they are to be used. That may involve DNS lookups, making TLS and HTTP connections, sending the request, and finally downloading the response, which can take tens or hundreds of milliseconds, depending on factors such as network connection or the number of DNS servers that are to be contacted.

One technique for improving load times is to utilize resource access instructions in the webpage code to cause the browser to proactively make connections or download content. Resource access instructions can improve performance because when the browser does realize it should to make a connection or request a resource, it has already done so as a result of the resource access instruction.

A resource access instruction can come in a variety of forms. For example, a "preload" resource access instruction can instruct the browser to proactively download a resource, a "preconnect" resource access instruction can instruct the browser to make a proactive HTTP connection to a domain, and a "DNS-prefetch" resource access instruction can instruct the browser to proactively make a DNS lookup for a domain. Other resource access instructions can include, but are not limited to, "prefetch," which is a lower priority version of preload, and a "prerender," which can instruct the browser to load an entire page and all of its dependent files in the background. When implemented in the webpage code, the resource access instructions tend to include their keyword: "preload," "preconnect." "DNS-prefetch." "prefetch." or "prerender," along with "link" elements, such as a <link rel=> tag or a Link: . . . ; rel=response header.

Although resource access instructions provide opportunities to improve webpage load performance, they also gives rise to technical challenges when it comes to their implementation. In particular, the questions of which connections to make, which content to download, and which resource access instructions to use are complex and are largely webpage-specific. To complicate matters, using too many resource access instructions or using a resource access instruction for the wrong resource can negatively impact webpage performance, sometimes more so than not implementing resource access instruction at all.

To address these or other challenges, a recommendation system can create and implement a resource access instruction policy to provide an objective authority to govern how, when, and why to implement resource access instructions. In particular, the resource access instruction policy can be structured by accepted rules and best practices for webpage optimization. By analyzing a webpage to determine how resources and resource access instructions are used by the webpage, the recommendation system can compare the webpage against the resource access instruction policy. If the recommendation system identifies an incongruity between the webpage implementation and the resource access instruction policy, the recommendation system can identify a fault (sometimes referred to as resource access fault) in the website code and provide instructions as to how to improve the website performance.

For purposes of this disclosure, the term "resource access fault" is used to broadly refer to any inconsistency between a webpage's implementation and the resource access instruction policy. By way of non-limiting example, if the resource access instruction policy indicates that a resource access instruction should be used for a particular resource, then the absence of a resource access instruction for that resource can correspond to a resource access fault. As a corollary, if the resource access instruction policy does not indicate that a resource access instruction should be used for a particular resource, then the presence of a resource access instruction for that resource can correspond to a resource access fault.

As described further herein, each resource access fault can correspond to a particular instruction or set of instructions in the webpage code. For instance, continuing with the examples above, if the absence of a resource access instruction for a particular resource is associated with the resource access fault, then a resource access fault can correspond to the webpage code that includes a request for that instruction. Furthermore, if the presence of a resource access instruction for a particular resource is associated with the resource access fault, then a resource access fault can correspond to the webpage code that includes that resource access instruction.

In light of the description herein, it will be understood that the embodiments disclosed herein substantially improve network communication and website performance. Specifically, the embodiments disclosed herein enable a system to monitor the performance of a webpage, including the use and performance of individual computing resources used to load the webpage, determine whether there are any faults associated with the webpage performance, identify computer-readable instructions or code that resulted in the faults, provide instructions to address the identified fault, and, in some cases, correct the fault in the computer-readable instructions, and/or generate computer-readable or executable instructions to fix the identified fault. The ability to monitor webpage performance and correct faults enables the underlying systems to more efficiently load webpages by: reducing the size of what is to be loaded as part of the webpage, which improves the speed of the webpage load time; decreasing the number or amount of computer resources used to load the webpage, which reduces processing time and usage of computer systems, reducing network usage by requesting less data or resources for user), which reduces network traffic, etc.

Thus, the presently disclosed embodiments represent an improvement at least in the functioning of network devices and webpage loading. Moreover, the presently disclosed embodiments address technical problems inherent within the networked systems and the Internet. These technical problems are addressed by the various technical solutions described herein, including the monitoring of the webpage, identifying faults, identifying computer-readable instructions associated with the faults, and correcting or providing information to correct the faults, etc. Thus, the present application represents a substantial improvement on existing distributed systems in general.

Environment Overview

FIG. 1 illustrates an embodiment of an environment 100 that includes a network 104, a code generator 102, and a recommendation system 106. In the illustrated embodiment, the recommendation system 106 includes an analyzer module 108, an execution module 110, and a parsing module 112. To simplify discussion and not to limit the present disclosure, FIG. 1 illustrates only one code generator 102 and recommendation system 106, though multiple may be used.

Any of the foregoing components or systems of the environment 100 may communicate via the network 104. Although only one network 104 is illustrated, multiple distinct and/or distributed networks 160 may exist. The network 104 can include any type of communication network. For example, the network 104 can include one or more of a wide area network (WAN), a local area network (LAN), a cellular network, an ad hoc network, a satellite network, a wired network, a wireless network, and so forth. In some embodiments, the network 104 can include the Internet.

Any of the foregoing components or systems of the environment 100, such as any one or any combination of the code generator 102, the recommendation system 106, the analyzer module 108, the execution module 110, or the parsing module 112 may be implemented using individual computing devices, processors, distributed processing systems, servers, isolated execution environments (e.g., virtual machines, containers, etc.), shared computing resources, or so on. Furthermore, any of the foregoing components or systems of the environment 100 may host or execute one or more client applications, which may include a web browser, a mobile application, a background process that performs various operations with or without direct interaction from a user, or a "plug-in" or "extension" to another application, such as a web browser plug-in or extension.

The code generator 102 can facilitate creating, editing, or publishing a webpage. For example, the code generator 102 may include hardware and software components for establishing communications over the network 104. The code generator 102 may have varied local computing resources such as central processing units and architectures, memory, mass storage, graphics processing units, communication network availability and bandwidth, and so forth. Further, the code generator 102 may include any type of computing system. For example, the code generator 102 may include any type of computing device(s), such as desktops, laptops, and wireless mobile devices (for example, smart phones, PDAs, tablets, or the like), to name a few.

In some cases, the code generator 102 includes website generation software (e.g., Adobe Dreamweaver CC, Wix, WordPress, Weebly, Webflow, Bluefish, etc.) that aid users in building websites, such as various tools for the creation of websites. As another example, the code generator 102 may include an interface for writing or uploading any of various programming languages including, but not limited to, HTML, CSS, Java, JavaScript, Python, C. C++, SQL, or PHP. The code generator 102 can generate, output, or obtain a machine-readable file usable to build a webpage. The machine-readable file can include a plurality of instructions that define the layout, structure, content, etc. of a webpage. For example, the machine-readable file can include, but is not limited to, any combination of HTML, CSS, Java, JavaScript, Python, SQL, or PHP. In some cases, the code generator 102 can be controlled or operated by a user, such as a web developer.

The recommendation system 108 can be implemented to audit a website or web application against a resource access instruction policy to identify portions in the website code that can be modified to improve website performance. Furthermore, the recommendation system 108 can provide instructions regarding what performance metric(s) can be improved with a code modification, where (in the webpage code or the developer's native code) to find the portion of code that can be modified to improve webpage performance, how to modify the code, and/or why that portion of code is undesirable.

For case of description, the recommendation system 108 is described as including various modules for performing tasks of the recommendation system 108. In particular, the recommendation system 108 is described to include an execution module 108, an analyzer module 110, and a parsing module 112. However, it will be understood that the recommendation system 108 can include fewer, more, or different modules and further understood that any of the execution module 108, the analyzer module 110, or the parsing module 112 can be combined. Furthermore, it will be understood that any of the systems or modules described herein may include software, firmware, hardware, or any combination(s) of software, firmware, or hardware suitable for the purposes described.

The execution module 110 facilitates the load of a particular webpage. For example, the execution module 110 can communicate a URL to a browser, causing the browser to load the webpage. In some cases, in response to receiving an indication of the URL from the execution module 110, the browser looks up an associated IP address for the domain name via the Domain Name System (DNS), initiates a connection to that IP address, and receives a machine-readable file (e.g., an HTML page) associated with the webpage. When the machine-readable file is downloaded, the browser parses the machine-readable file to load in all the other resources that are used to display the webpage properly. Examples of such resources include, but are not limited to, CSS files, Javascript files, images, fonts, and other webpages.

The machine-readable file can vary across embodiments. A Hypertext Markup Language (HTML) file is the standard webpage file type on the Internet. Thus, in some cases, the machine-readable file is an HTML file. However, the machine-readable file can be any type of file usable by the browser to render a webpage. For example, the machine-readable file can include a plurality of instructions that define the webpage layout and the content of the webpage, such as the text, tables, images, or hyperlinks associated with the webpage.

The execution module 110 can communicate the URL to the browser in various ways. For example, in some cases, the execution module 110 includes a user interface, from which a user may select a hyperlink, submit a form, or type in the URL. As another example, the execution module 110 may be configured to obtain the URL (e.g., from memory, from another browser tabs, from another browser) and pass the URL to the browser. In some cases, the execution module 110 includes or is part of the browser. In some such cases, the execution module 110 can receive an indication of the URL, look up an associated IP address for the domain name via the DNS, initiate a connection to that IP address, receive the machine-readable file associated with the webpage, and/or parse the machine-readable file to load in the other resources that are part of the webpage.

The analyzer module 110 monitors the webpage and collects performance metrics associated with the webpage load. The analyzer module 110 can collect performance data while analyzing the website. For example, while the webpage is loading, the analyzer module 110 can determine timing, bandwidth, server, CPU, resource size, or browser data associated with some or all user actions, some or all requests/responses, and some or all of the browser, timing, or UX events that occur during the run of the script. In some cases, the results of this data can be trended on graph, such as a waterfall graph. The performance metrics can include any combination of timing, bandwidth, server, CPU, resource size, or browser data. For example, the performance metrics can include, but are not limited to, server time, render time, load time, page size, time to complete transactions, first CPU idle, time to interactive (TTI) (the time from when the page starts loading to when it's visually rendered, its initial scripts (if any) have loaded, and it's capable of reliably responding to user input quickly), first contentful paint (FCP) (the time from when the page starts loading to when any part of the page's content is rendered on the screen), largest contentful paint (the time from when the page starts loading to when the largest text block or image element is rendered on the screen), first input delay (the time from when a user first interacts with the site (i.e. when they click a link, tap a button, or use a custom, JavaScript-powered control) to the time when the browser is actually able to respond to that interaction), total blocking time (the total amount of time between FCP and TTI where the main thread was blocked for long enough to prevent input responsiveness) or the cumulative layout shift (cumulative score of some or all unexpected layout shifts that occur between when the page starts loading and when its lifecycle state changes to hidden).

In some cases, the performance metrics can be relevant to how users perceive performance. For example, performance metrics can include perceived load speed (such as how quickly a page can load and render some or all of its visual elements to the screen), load responsiveness (such as how quickly a page can load and execute any relevant JavaScript code in order for components to respond quickly to user interaction), runtime responsiveness (such how quickly can the page respond to user interaction as after page load), visual stability (for example, do elements on the page shift in ways that users don't expect and potentially interfere with their interactions?), or smoothness (for example, do transitions and animations render at a consistent frame rate and flow fluidly from one state to the next?).

The parsing module 112 identifies resource access faults associated with the webpage. In some cases, to determine whether a resource access fault is present, the parsing module 112 can identify existing resource access instructions within the machine-readable file, determine suggested resource access instructions based on the performance metrics and/or the resource access instruction policy, and identify discrepancies between the existing resource access instructions and the suggested resource access. In some such cases, the identified discrepancies correspond to resource access faults.

The parsing module 112 can review the machine-readable file to search for indications of existing resource access instructions. For example, the parsing module 112 may determine that the machine-readable file includes a preload resource access instruction based on an determination that an instruction within the machine-readable file includes the keyword "preload" in combination with a <link rel=> tag or a Link: . . . ; rel=response header. Furthermore, the parsing module 112 may also determine the resource associated with the resource access instruction. For example, upon finding the following instruction: <link rel="preload" href="resources/roboto.woff" as="font" crossorigin="anonymous"/>, the parsing module 112 can determine that a preload resource access instruction is present for the font "roboto.woff". The parsing module 112 can make similar determinations for other resource access instructions, for example in response to finding their corresponding key word.

The parsing module 112 can determine suggested resource access instructions based on the performance metrics and/or the resource access instruction policy. For example, the parsing module 112 can apply the resource access instruction policy to the machine-readable file to determine which resources and domains should or should not have a corresponding resource access instructions. Upon determining the suggested resource access instructions, the parsing module 112 can compare the suggested resource access instructions to the existing resource access instructions. If the parsing module 112 determines that the suggested resource access instructions match the existing resource access instructions, then the parsing module 112 can determine that no resource access fault exists. If the parsing module 112 identifies a discrepancy between the suggested resource access instructions and the existing resource access instructions, then the parsing module 112 can identify that a resource access fault exists.

Figure 2:
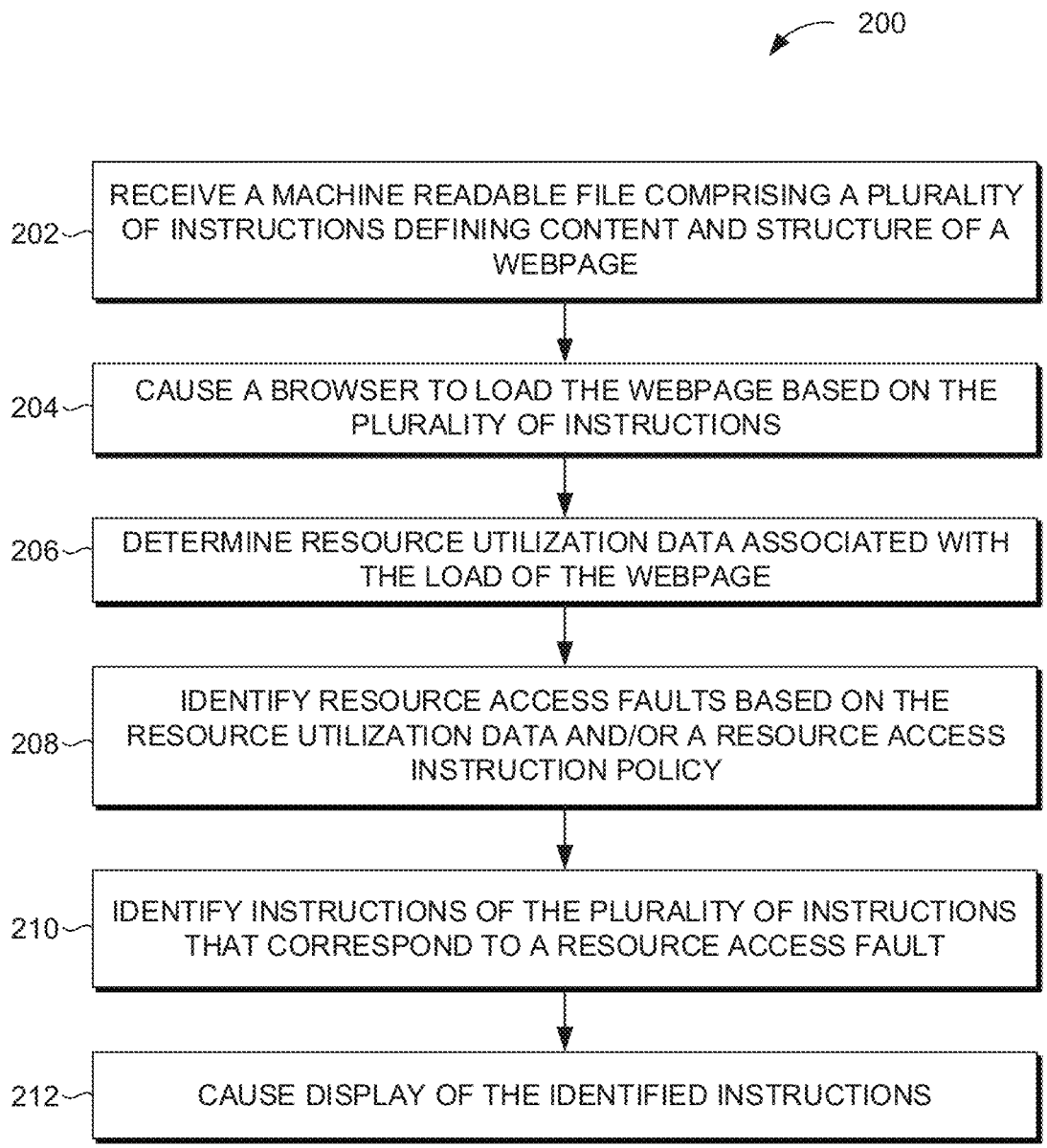
FIG. 2 is a flow diagram illustrative of an embodiment of a routine implemented by a recommendation system for identifying and indicating resource access faults associated with a webpage.

FIG. 2 is a flow diagram illustrative of an embodiment of a routine 200 implemented by the recommendation system 106 for identifying and indicating resource access faults associated with a webpage. Although described as being implemented by the recommendation system 106, it will be understood that one or more elements outlined for routine 200 can be implemented by one or more computing devices/components that are associated with the recommendation system 106, such as, but not limited to, the analyzer module 108, the execution module 110, and/or the parsing module 112. Thus, the following illustrative embodiment should not be construed as limiting.

At block 202, the recommendation system 106 receives a machine-readable file that defines at least the content and the structure of a webpage. As described herein, the recommendation system 106 can receive the machine-readable file as part of the process of loading the webpage. In some cases, the recommendation system 106 can receive the machine-readable file from a server. For example, the recommendation system 106 can include a browser that initiates an HTTP connection with the server and receives the machine-readable file from the web server via the HTTP channel. In some cases, the recommendation system 106 can receive the machine-readable file from the browser. For example, the recommendation system 106 may be different from, but in communication with, the browser such that the recommendation system 106 can download the machine-readable file from the browser or the server. For purposes of this example, the machine-readable file will be described as an HTML file. However, it will be understood that the machine-readable file can include a file other than an HTML file, and thus the description should not be construed as limiting.

At block 204, the recommendation system 106 causes a browser to load the webpage based on a plurality of instructions in the HTML file. As described, when the machine-readable file is downloaded, the browser parses the machine-readable file to load the other resources that are used to display the webpage properly. Examples of such resources include, but are not limited to, CSS files, Javascript files, images, fonts, and other webpages.

At block 206, the recommendation system 106 determines resource utilization associated with the load of the webpage. For example, as described, the recommendation system 106 can monitor the webpage and collect performance metrics associated with the webpage load. The performance metrics can include, but are not limited to, server time, render time, load time, page size, time to complete transactions, first CPU idle, time to interactive, first contentful paint, largest contentful paint, first input delay, total blocking time or the cumulative layout shift.

At block 208, the recommendation system 106 identifies resource access faults based on the resource utilization data and/or a resource access instruction policy. For example, the recommendation system 106 can audit the HTML file to determine whether it is in congruence with the resource access instruction policy. If the HTML file satisfies the resource access instruction policy, the recommendation system 106 may determine that no resource access faults are present in the HTML file. If the HTML file does not the resource access instruction policy, the recommendation system 106 may determine that a resource access fault is present in the HTML file. As described, the recommendation system 106 can analyze the plurality of instructions of the machine-readable file to identify any resource access instructions therein. Furthermore, the recommendation system 106 can compare the use of the resource access instructions to a recommended use, as designated according to the resource access instruction policy.

The resource access instruction policy can indicate what is considered a resource access fault and/or how to determine the presence of a resource access fault. In some cases, the resource access instruction policy can indicate that a resource access fault corresponds to the presence of a particular resource access instruction in the plurality of instructions of the machine-readable file. For example, the resource access instruction policy can indicate that the presence of too many resource access instructions, duplicate resource access instructions, resource access instructions for unused or secondary content, an unsupported resource access instruction, or the like can correspond to a resource access fault. Furthermore, in some cases, the resource access instruction policy can indicate that a resource access fault corresponds to the absence of a particular resource access instruction in the plurality of instructions of the machine-readable file. For example, the resource access instruction policy can indicate that the absence of a resource access instruction for used domains, first party domains, third party domains, rendering path resources (e.g., resources used in the sequence of steps the browser goes through to convert a machine-readable file, such as HTML, CSS, and JavaScript into pixels on a screen), primary content, or the like can correspond to a resource access fault.

In some implementations, the resource access instruction policy indicates to determine a resource access fault based at least in part on the number of resource access instructions present within the plurality of instructions of the machine-readable file. For example, the resource access instruction policy can identify a threshold (e.g., an acceptable limit or range) for the number of resource access instructions that may be present in the plurality of instructions. In some such cases, the resource access instruction policy can indicate to determine a resource access fault if the number of resource access instructions within the plurality of instructions satisfies or exceeds the threshold. In some cases, the resource access instruction policy may define a collective threshold for some or all types of resource access instructions (e.g., preload, preconnect, DNS-prefetch).

As another example, the resource access instruction policy may define individual thresholds for one, some, or all types of resource access instructions. For instance, in some cases, using an excessive number of preloads can distract the browser from obtaining rendering path resources. As such, the resource access instruction policy can set a threshold for preloads, such as no more than 3-4. However, this preload threshold can vary across embodiments, for example based on a number of available request slots or download bandwidth of the browser. Similarly, making too many preconnects, preconnecting to a domain that is then not used, or not used within a threshold time period (e.g., five, ten, eleven, or more seconds, etc.), can create resource contention or can make the browser operate inefficiently. As such, the resource access instruction policy can set a threshold for preloads, such as no more than 6-8. However, this preconnect threshold can vary across embodiments, for example based on a number of available connection slots of the browser or the load on a web server. Furthermore, making too many DNS prefetches, or doing a DNS prefetch for a domain that ultimately is not used, can create resource contention or can make the browser operate inefficiently. As such, the resource access instruction policy can set a threshold for DNS-prefetches, such as no more than 6-8. However, the DNS-prefetch threshold can vary across embodiments, for example based on a number of available slots that the browser has available for DNS lookup. In some cases, one or more of these thresholds may be dynamic (e.g., based available resources) or may be other factors, such as heuristic best practices relating to website optimization and performance.

In some implementations, the resource access instruction policy indicates to determine a resource access fault based at least in part on the presence or absence of a resource access instruction for a particular category of content. For example, in some cases, the content associated with a webpage can be divided into at least two categories: primary content and secondary content. In some such cases, the resource access instruction policy can indicate to determine a resource access fault if a resource access instruction is present for secondary content or if a resource access instruction is absent for secondary content.

The classification of content as "secondary content" or "primary content" can vary across embodiments. In some cases, resources on the rendering path (e.g., those resource that are to be loaded or used for rendering the page) are classified as primary content. In some cases, resources that are not on the rendering path (e.g., those resources that are not to be used or are optional for rendering the page or that may be used after the page is rendered) are classified as secondary content. In some cases, certain types of sources are classified as primary content. For example, in some cases, "font," "script." and "style" resources are categorized as primary content. In some cases, certain types of resources are classified as secondary content. For example, in some cases, "audio," "document." "embed." "image," "object," "track," and "video" resources are categorized as secondary content. However, it will be understood that a particular type of resource may be primary content for a first webpage and secondary content for a second webpage.

As another example, the domains associated with a webpage can be divided into at least two categories: primary domains and secondary domains. In some such cases, the resource access instruction policy can indicate to determine a resource access fault based at least in part on a determination that a resource access instruction is present for a secondary domain. As a corollary, the resource access instruction policy can indicate to determine a resource access fault based at least in part on a determination that a resource access instruction is absent for primary domain. For example, the resource access instruction policy can indicate to determine a resource access fault based at least in part on a determination that a preconnect resource hint is not used to make a proactive connection to a primary domain.

The classification of domains as a "primary domain" or "secondary domain" can vary across embodiments. For example, in some cases, domains with resources that are used to render or interact with the webpage, domains with a threshold number of requests, domains with a threshold amount of content, and/or domains that are discovered later in the waterfall are classified as primary domains and/or all other domains are classified as secondary domains.

In some implementations, the resource access instruction policy indicates to determine a resource access fault based at least in part on the browser being utilized and/or the types of resource access instructions supported by that browser. For example, in some cases, the resource access instruction policy indicates to determine a resource access fault based at least in part the presence of a resource access instruction that is unsupported by the current browser, a particular browser (e.g., Internet Explorer, Google Chrome, Mozilla Firefox, Safari, Opera, Konqueror, Lynx, etc.), or a particular set of browsers (e.g., top 3 or 5 most popular browsers). As example, some browsers may support a preconnect resource hint, but not a DNS-prefetch. In some such cases, the resource access instruction policy can indicate to determine a resource access fault based at least in part on determination that an unsupported resource access instruction is present in the plurality of instructions.

In some implementations, the resource access instruction policy indicates to determine a resource access fault based at least in part on the presence of a particular implementation of a resource access instruction. For example, some implementations of resource access instructions are supported by some, but not all, browsers. For example, a set of browsers (e.g., Google Chrome) may support a <link> tag to define multiple resource access instructions inside the same <link> tag, such as: <link rel="preconnect dns-prefetch" href="https://example.com/">, while another set of browsers (e.g., Safari) might not support specifying two resource access instructions in the same tag. In some such cases, the resource access instruction policy can indicate to determine a resource access fault if the unsupported usage of the resource access instruction is present.

In some implementations, the resource access instruction policy indicates to determine a resource access fault based at least in part on the presence of a resource access instruction for an unused or unexecuted resource. As described, resource access instructions can instruct the browser to proactively make connections or download content. Thus, the presence of a resource access instruction for an unused or unexecuted resource can decrease performance. For example, using a preconnect to make a proactive connection to a domain that is then not used, or not used with a threshold time period, can make the browser operate inefficiently or can hurt the browser by impeding connections to other domains. Furthermore, open TCP or encrypted TLS connections use server resources.

In some implementations, the resource access instruction policy indicates to determine a resource access fault based at least in part on the presence of a resource access instruction for a resource that is not used within a threshold period of time. For example, some browsers may close connections to a domain that were made with a preconnect if no requests are made to that domain within a threshold period of time (e.g., 10 seconds). These premature preconnects can waste time and resources.

In some implementations, the resource access instruction policy indicates to determine a resource access fault based at least in part on the absence of a resource access instruction for a resource that corresponds to Third Party Content and/or First Party Content. Third Party Content generally refers to any content linked to a user's webpage which the user does not have direct control over. For example, an advertising beacon or externally hosted JavaScript library may be considered Third Party Content. First Party Content, on the other hand, refers to content that the user either hosts or has the ability to update and change. In some cases, the resource access instruction policy indicates to determine a resource access fault based at least in part on a determination that a resource access instruction is not used for a Third Party Content resource and/or First Party Content. In some implementations, the resource access instruction policy indicates to determine a resource access fault based at least in part on a determination that a DNS-prefetch is not used to make a connection to a third party domain and/or a first party domain. In some such cases, the resource access instruction policy can based on the determination of the resource access fault on other factors, such as whether the domain is discovered later in the waterfall, whether the domain includes resources that then causes other requests to occur, and/or whether domain is a domain with a lot of requests or one which downloads a large amount of content.

Consider a scenario in which the resource access instruction policy indicates that all third party domains that are not associated with a DNS-prefetch should be identified as being associated with a resource access fault. In some such cases, the recommendation system can identify some or all third party domains associated with the plurality of instructions, can determine whether these identified third party domains are associated with DNS-prefetch, and can determine a resource access fault based on a determination that one or more of the identified third party domains are not associated with a DNS-prefetch.

HTTP/1.x is in the process of being replaced by HTTP/2 (H2) and HTTP/3 (H3) due to many shortcomings. H2 and H3 are able to download resources more efficiently and use advanced features such as H2 push. Thus, webpages that use HTTP/1.x typically look for other optimizations that allow it to achieve great performance. Accordingly, in some implementations, the resource access instruction policy indicates to determine a resource access fault based at least in part on a determination that the webpage is accessed over HTTP/1.x and a determination that the plurality of instructions does not include a preload. In some cases, the resource access instruction policy can provide guidance regarding which resources are good candidates for preloading. For example, in some cases, the resource access instruction policy that the following are good candidates for preloading: font files referenced inside other CSS files; dynamically loaded JavaScript files that cannot be asynced or deferred; CSS files referenced inside other CSS files, or business resources in the HTML.

As another example, in some cases, the resource access instruction policy that the following should not be preloaded: resources that are directly referenced early in the HTML file; and resources that are not part of the rendering path, or are not used early by the page.

In some implementations, the resource access instruction policy indicates to determine a resource access fault based at least in part on a presence of a DNS-prefetch for an unused domain. As described, resource access instructions can instruct the browser to proactively make connections or download content. Thus, the presence of a resource access instruction for an unused domain can decrease performance. For example, making a DNS lookup for a domain that ultimately is not used can create resource contention and can make the browser operate inefficiently.

In some implementations, the resource access instruction policy indicates to determine a resource access fault based at least in part on a presence of a preconnect and a DNS-prefetch for the same domain. Browsers that support DNS-prefetch may also support preconnect. Thus, depending on the order of the DNS-prefetch/preconnects on the page, the browser may inadvertently use the less optimized resource access instruction, resulting in slower overall performance metrics. Using both also slightly increases the size of the page. Removing these redundant DNS-prefetch hints can result in a smaller page and improve performance.

At block 210, the recommendation system 106 identifies instructions of the plurality of instructions that correspond to a resource access fault. As described, in some cases, the resource access fault is associated with the absence of a resource access instruction. For example, the resource access instruction policy can indicate that the absence of a resource access instruction for primary domains, first party domains, third party domains, rendering path resources, primary content, or the like can correspond to a resource access fault. In some such cases, the recommendation system 106 can identify the portion of the instructions of the plurality of instructions that corresponding to the particular resource for which the resource access instruction is absent. For example, consider a scenario in which the machine-readable file is an HTML file and the recommendation system 106 has determined that a resource access fault exists because the HTML file does not include a preconnect for a particular domain. In some such cases, the recommendation system 106 can identify the line of HTML text that corresponding to that resource.

Furthermore, as described, in some cases, the resource access fault is associated with the presence of a resource access instruction. For example, the resource access instruction policy can indicate that the presence of too many resource access instructions, duplicate resource access instructions, resource access instructions for unused or secondary content, an unsupported resource access instruction, or the like can correspond to a resource access fault. In some such cases, the recommendation system 106 can identify the portion of the instructions of the plurality of instructions that includes the particular resource access instruction. For example, consider a scenario in which the machine-readable file is an HTML file and the recommendation system 106 has determined the HTML file includes a resource access instruction that is associated with a resource access fault. In some such cases, the recommendation system 106 can identify the line of HTML text that includes the particular resource access instruction.

At block 212, the recommendation system 106 causes display of the identified instructions. In some cases, the display of the identified instructions includes at least a subset of the plurality of instructions. For example, the display can include the plurality of instructions, wherein the identified instructions are displayed differently (e.g., highlighted, bolded, italicized, etc.) as compared to non-identified instructions. In some cases, the display can include summary of each resource access fault including, for example, the corresponding identified instructions, an indication of the affected resource, a severity level, an indication of why the resource access fault was identified, suggested solutions, projected results (e.g., Fixing will reduce request count by 1, Fixing will reduce request size by 592 bytes, Fixing will reduce response size by 233 bytes, Fixing will improve quality score by 3,000%, etc.) or the like.

In some cases, the recommendation system can generate computer-readable and/or computer-executable instructions from the instructions identified at block 210. The generated instructions can be in one or more programming languages (e.g., the native language used by the developer to create the machine-readable file) The generated instructions and the identified instructions from which the generated instructions were generated can be displayed. This may advantageously streamline the improvement of the website, since the resource access faults would be shown relative to the programming language that was used to create the machine-readable file, rather than (or in addition to) showing the instructions of the machine-readable file. As an illustrative example, consider an instance in which the machine-readable file is an HTML file and that a website developer uses Python to create the file. In this example, displaying relevant portions of the HTML file to the developer may not be as helpful to the developer as would displaying relevant portions of the Python script. This is because if the developer wishes to update her website, she will likely update her Python script, rather than directly updating the HTML file. Accordingly, in some cases, the recommendation system translates the instructions to a programming language other than the language of the machine-readable file. With reference to the example above, the recommendation system can generate Python script from the relevant portions of the HTML file into Python.

In certain cases, to generate instructions in a different programming language, the recommendation system can include directories or files of the various instructions from the different programming languages. The recommendation system can also include correspondence information that identifies a relationship between a computer-readable command in one language and a similar computer-readable command in a second language. Using this information, the recommendation system can generate computer-readable or computer-executable instructions in one programming language from the instructions identified at block 210.

The particular language of the generated instructions can vary across embodiments. In some cases, the native language used to create the machine-readable file is known by the recommendation system. For example, it may be an input provided by the developer or the recommendation system may have access to a copy of the original native code. In some such cases, the recommendation system can generate instructions (or some portion of the machine-readable file) in the native code from the identified instructions. In some cases, the native language used to create the machine-readable is unknown by the recommendation system. In some such cases, the recommendation system can, from the identified instructions, generate multiple sets of instructions. In certain cases, the generated instructions can be in a frequently used programming language (e.g., JavaScript, SQL, PHP, Python, etc.) or other languages as selected by a user or based on a default. In this way, the recommendation system further streamlines the improvement and revisions of the webpage by providing the instructions (and any summary or recommendations) based on the native code.

In some cases, such as when the recommendation system has access to the native code, the recommendation system can update the native code to reflect its recommendations. Furthermore, in some cases, even when the recommendation system does not have access to the native code, the recommendation system can make predictions as to which programming language was used and/or how the script was written. For example, in many cases, developers follow conventional techniques for creating HTML files. The recommendation system can include or access a library that stores translations of various programming languages to HTML text. In some cases, when the recommendation system identifies HTML instructions, it can translate those instructions to the desired programming language using the stored translations. In this way, while the recommendation system may not output the exact style used by the developer, it can provide its best guess for how the developer wrote her code and what to do to update it.

Although the routine 200 is generally described as being associated with a single webpage, it will be understood that the routine 200 can be performed to identify and/or indicate resource access faults associated with multiple webpages, such as tens, thousands, or millions or webpages. For example, in some cases, the recommendation system 106 perform the routine 200 for tens, thousands, or millions of webpages concurrently or successively. In this way, the recommendation system 106 may receive thousands or millions of machine readable files, cause a browser or multiple browsers to load thousands or millions of webpages, determine resource utilization associated with the load of each webpage, etc.

Furthermore, the routine 200 can be performed multiple times, such as tens, thousands, or millions of times, for the same webpage. For example, the recommendation system 106 can perform the routine 200 multiple times and can take an average result. In some such cases, the routine 200 can be performed concurrently or successively, from various server locations, at various times of the day, at various server loads, etc. In this way, the recommendation system 106 can access the webpage under various webpage and/or server conditions.

FIG. 3 illustrates a visual display of a resource access fault identified by the recommendation system 204. In this example, the machine-readable file is an HTML document 300 that includes 36 lines, and in this case, as indicated by the highlighted line, the recommendation system 204 has output an indication that the instructions on line 27 correspond to a resource access fault. For example, the recommendation system 204 may have identified the resource access fault based on a determination that the instruction on line 27 was making a connection to a domain that was not ultimately used. It will be understood that the display of the identified instructions corresponding to the resource access fault can vary across embodiments. For example, in the illustrates embodiment of FIG. 3, the recommendation system 204 causes display of an annotated version of the entire HTML file. However, in some cases, a subset of the HTML file can be displayed, such as the just the portion of the instructions that correspond to the resource access fault.

FIG. 4A illustrates a portion of an example waterfall diagram 400 associated with the loading of a webpage. The waterfall diagram 400 includes a cascading chart that show visualizations of HTTP requests that are being made when a web browser loads and renders a webpage. In particular, each row of the diagram waterfall diagram 400 is a separate request made by the browser, and the varying bar-lengths represent how long each took to request, download, and/or execute. The waterfall diagram 400 shows a request 402 for a CSS file from Google. In this case, this resource is discovered later in the waterfall and an existing HTTP connection does not exist. Therefore, when the browser determines that it will download and use the CSS file, but it will first complete a DNS lookup, then create a TCP connection, and finally negotiate an encrypted TLS connection. These steps add roughly 100 ms of delay that occurs before the CSS file can be requested.

FIG. 4B illustrates a portion of an example waterfall diagram 450 associated with the loading of a webpage. The waterfall diagram 450 is the same as the waterfall diagram 400 of FIG. 4A, except this time the webpage code is modified to include a preconnect in the <head> of the HTML file, as shown: <link rel="preconnect" href="https://fonts.googleapis.com/">. As seen from a comparison of FIG. 4B to FIG. 4A, the preconnect hint instructs the browser to proactively connect to the Google Fonts domain. As a result, when the browser later discovers the CSS file to request, a connection has already been established. This allowed the CSS file to download immediately, shifting the overall waterfall to the left, thereby saving approximately 100 ms as compared to the waterfall diagram 400.

Consider a scenario in which the webpage code associated with FIG. 4A were analyzed by the recommendation system 106 and that the resource access instruction policy indicates that a resource access fault should be identified in instances in which no resource access instruction is present for a primary domain. In such an instance, the recommendation system 106 could analyze the webpage code associated with FIG. 4A to determine that the Google Fonts domain is a primary domain and also determine that no resource access instruction is present for that domain. Accordingly, the recommendation system 106 could determine that the webpage code associated with FIG. 4A includes a resource access fault. The recommendation system could also identify the relevant command to include in the HTML file, generate instructions in another programming language for inclusion in a computer-readable file that is used to generate the HTML file, and/or automatically correct the code in the computer-readable file that is used to generate the HTML file.

Example Embodiments

Embodiments of the present disclosure can be described in view of the following clauses:

Clause 1. A method for identifying and indicating resource access faults associated with a webpage, the method comprising:
   receiving a machine-readable file, the machine-readable file comprising a plurality of instructions defining at least content and structure of a webpage;
   causing a browser to load the webpage based at least in part on the machine-readable file;
   determining resource utilization data associated with the load of the webpage;
   identifying one or more resource access faults associated with the machine-readable file based at least in part on the determined resource utilization and a resource access instruction policy;
   for each of the one or more resource access faults, identifying an instruction of the plurality of instructions that corresponds to the particular resource access fault; and
   causing display of the one or more instructions.

Clause 2. The method of Clause 1, further comprising:
   identifying existing resource access instructions within the plurality of instructions; and
   determining recommended resource access instructions based at least in part on the resource utilization,
   wherein the resource access instruction policy indicates to determine a resource access fault based at least in part on a difference between the existing resource access instructions and the recommended resource access instructions.

Clause 3. The method of any of the previous clauses, wherein the resource access instruction policy indicates to determine a resource access fault based at least in part on a determination that a number of resource access instructions associated with the plurality of instructions satisfies a threshold, wherein the resource access instructions comprises at least one of a preload, preconnect, or a DNS-prefetch.

Clause 4. The method of any of the previous clauses, wherein the resource access instruction policy indicates to determine a resource access fault based at least in part on a determination that the plurality of instructions is associated with a preload for secondary content.

Clause 5. The method of any of the previous clauses, wherein the resource access instruction policy indicates to determine a resource access fault based at least in part on a determination that the plurality of instructions includes an individual instruction that is associated with multiple resource access instructions.

Clause 6. The method of any of the previous clauses, wherein the resource access instruction policy indicates to determine a resource access fault based at least in part on an absence of a preload for a primary domain.

Clause 7. The method of any of the previous clauses, wherein the resource access instruction policy indicates to determine a resource access fault based at least in part on a presence of a preconnect for an unused domain.

Clause 8. The method of any of the previous clauses, wherein the resource access instruction policy indicates to determine a resource access fault based at least in part on a presence of a preconnect for a first domain and a determination that no requests by the browser were made to the first domain within a threshold amount of time.

Clause 9. The method of any of the previous clauses, wherein the resource access instruction policy indicates to determine a resource access fault based at least in part on an absence of a DNS-prefetch for a first party domain.

Clause 10. The method of any of the previous clauses, wherein the resource access instruction policy indicates to determine a resource access fault based at least in part on an absence of a DNS-prefetch for a third party domain.

Clause 11. The method of any of the previous clauses, wherein the resource access instruction policy indicates to determine a resource access fault based at least in part on a determination that the webpage is accessed over HTTP/1.x and a determination that the plurality of instructions is not associated with a preload.

Clause 12. The method of any of the previous clauses, wherein the resource access instruction policy indicates to determine a resource access fault based at least in part on a presence of a DNS-prefetch for an unused domain.

Clause 13. The method of any of the previous clauses, wherein the resource access instruction policy indicates to determine a resource access fault based at least in part on a presence of a preconnect and a DNS-prefetch for the same domain.

Clause 14. The method of any of the previous clauses, further comprising:
  identifying existing resource access instructions within the plurality of instructions; and
  determining recommended resource access instructions based at least in part on the resource utilization; and
  wherein the resource access instruction policy indicates to determine a resource access fault based at least in part on a difference between the existing resource access instructions and the recommended resource access instructions.

Clause 15. The method of any of the previous clauses, further comprising:
  requesting content associated with a webpage from a webserver,
  wherein said receiving the machine generated file is based on said receiving the content.

Clause 16. The method of any of the previous clauses, further comprising:
  responsive to a user action, requesting content associated with a webpage from a webserver, wherein the user action corresponds to at least one of a selection of a hyperlink or an entry of a URL into a browser,
  wherein said receiving the machine generated file is based on said receiving the content.

Clause 17. The method of any of the previous clauses, wherein the machine generated file comprises an HTML file.

Clause 18. The method of any of the previous clauses, further comprising identifying one or more resource access instructions associated with the plurality of instructions, wherein the one or more resource access instructions comprise at least one of a preload, a preconnect, or DNS-prefetch.

Clause 19. The method of any of the previous clauses, further comprising identifying one or more resource access instructions associated with the plurality of instructions, wherein the one or more resource access instructions comprise an instruction to download a particular resource.

Clause 20. The method of any of the previous clauses, further comprising identifying one or more resource access instructions associated with the plurality of instructions, wherein the one or more resource access instructions comprise an instruction to make a HTTP connection to a particular domain.

Clause 21. The method of any of the previous clauses, further comprising identifying one or more resource access instructions associated with the plurality of instructions, wherein the one or more resource access instructions comprise an instruction to make a HTTP connection to a particular domain, wherein to make the HTTP connection to the particular domain comprises making a DNS lookup, making a TCP connection, and negotiating a secure TLS connection.

Clause 22. The method of any of the previous clauses, The method of any of the previous clauses, further comprising identifying one or more resource access instructions associated with the plurality of instructions, wherein the one or more resource access instructions comprise an instruction to make a DNS lookup for a particular domain.

Clause 23. The method of any of the previous clauses, wherein said causing the browser to load the webpage comprises causing the browser to parse the plurality of instructions and communicate requests for resources identified by plurality of instructions.

Clause 24. The method of any of the previous clauses, further comprising:
  parsing tags and/or headers in the plurality of instructions;
  identifying at least one tag or header in the plurality of instructions that includes a resource access instruction.

Clause 25. The method of any of the previous clauses, further comprising:
  identifying the particular instructions that are associated with at least one of a <link rel> tag or a Link HTTP header.

Clause 26. The method of any of the previous clauses, further comprising:
  identifying the particular instructions that are associated with at least one of a <link rel="preload"> tag or a Link: . . . ; rel="preload" response header.

Clause 27. The method of any of the previous clauses, further comprising:
  identifying the particular instructions that are associated with at least one of a <link rel="preconnect"> tag or a Link: . . . ; rel="preconnect" response header.

Clause 28. The method of any of the previous clauses, further comprising:
  identifying the particular instructions that are associated with at least one of a <link rel="dns-prefetch"> tag or a Link: . . . ; rel="dns-prefetch" response header.

Clause 29. The method of any of the previous clauses, wherein the resource utilization data comprises timing information associated with content requests from the browser.

Clause 30. The method of any of the previous clauses, wherein the resource utilization data comprises an indication of one or more resources identifier in the plurality of instructions.

Clause 31. The method of any of the previous clauses, further comprising generating a second file based at least in part on the plurality of instructions and the identified one or more resource access faults, wherein the second file includes fewer resource access faults than the machine-readable file.

Clause 32. The method of any of the previous clauses, further comprising generating a second file based at least in part on the plurality of instructions and the identified one or more resource access faults, wherein the second file includes fewer resource access faults than the machine-readable file, wherein the second file includes a programming language different from that of the machine-readable file.

Clause 33. The method of any of the previous clauses, further comprising generating a second file based at least in part on the plurality of instructions and the identified one or more resource access faults, wherein the second file includes fewer resource access faults than the machine-readable file, wherein the second file includes a programming language that was used to generated the machine-readable file.

Clause 34. A computing system comprising:
  memory; and
  one or more processors coupled to the memory and configured to:
  receive a machine-readable file, the machine-readable file comprising a plurality of instructions defining at least content and structure of a webpage;
  cause a browser to load the webpage based at least in part on the machine-readable file;
  determine resource utilization data associated with the load of the webpage;
  identify one or more resource access faults associated with the machine-readable file based at least in part on the determined resource utilization and a resource access instruction policy;

for each of the one or more resource access faults, identify an instruction of the plurality of instructions that corresponds to the particular resource access fault; and cause display of the one or more instructions.

Clause 35. The system of Clause 34, wherein the one or more processors are further configured to:
identify existing resource access instructions within the plurality of instructions; and
determine recommended resource access instructions based at least in part on the resource utilization,
wherein the resource access instruction policy indicates to determine a resource access fault based at least in part on a difference between the existing resource access instructions and the recommended resource access instructions.

Clause 36. The system of any of Clauses 34 to 35, wherein the resource access instruction policy indicates to determine a resource access fault based at least in part on a determination that a number of resource access instructions associated with the plurality of instructions satisfies a threshold, wherein the resource access instructions comprises at least one of a preload, preconnect, or a DNS-prefetch.

Clause 37. The system of any of Clauses 34 to 36, wherein the resource access instruction policy indicates to determine a resource access fault based at least in part on a determination that the plurality of instructions is associated with a preload for secondary content.

Clause 38. The system of any of Clauses 34 to 37, wherein the resource access instruction policy indicates to determine a resource access fault based at least in part on a determination that the plurality of instructions includes an individual instruction that is associated with multiple resource access instructions.

Clause 39. The system of any of Clauses 34 to 38, wherein the resource access instruction policy indicates to determine a resource access fault based at least in part on an absence of a preload for a primary domain.

Clause 40. The system of any of Clauses 34 to 39, wherein the resource access instruction policy indicates to determine a resource access fault based at least in part on a presence of a preconnect for an unused domain.

Clause 41. The system of any of Clauses 34 to 40, wherein the resource access instruction policy indicates to determine a resource access fault based at least in part on a presence of a preconnect for a first domain and a determination that no requests by the browser were made to the first domain within a threshold amount of time.

Clause 42. The system of any of Clauses 34 to 41, wherein the resource access instruction policy indicates to determine a resource access fault based at least in part on an absence of a DNS-prefetch for a first party domain.

Clause 43. The system of any of Clauses 34 to 42, wherein the resource access instruction policy indicates to determine a resource access fault based at least in part on an absence of a DNS-prefetch for a third party domain.

Clause 44. The system of any of Clauses 34 to 43, wherein the resource access instruction policy indicates to determine a resource access fault based at least in part on a determination that the webpage is accessed over HTTP/1.x and a determination that the plurality of instructions is not associated with a preload.

Clause 45. The system of any of Clauses 34 to 44, wherein the resource access instruction policy indicates to determine a resource access fault based at least in part on a presence of a DNS-prefetch for an unused domain.

Clause 46. The system of any of Clauses 34 to 45, wherein the resource access instruction policy indicates to determine a resource access fault based at least in part on a presence of a preconnect and a DNS-prefetch for the same domain.

Clause 47. The system of any of Clauses 34 to 46, wherein the one or more processors are further configured to:
identify existing resource access instructions within the plurality of instructions; and
determine recommended resource access instructions based at least in part on the resource utilization; and
wherein the resource access instruction policy indicates to determine a resource access fault based at least in part on a difference between the existing resource access instructions and the recommended resource access instructions.

Clause 48. The system of any of Clauses 34 to 47, wherein the one or more processors are further configured to:
request content associated with a webpage from a webserver,
wherein to receive the machine-readable file, the one or more processors are configured to receive the machine-readable file based on receiving the content.

Clause 49. The system of any of Clauses 34 to 48, wherein the one or more processors are further configured to:
responsive to a user action, request content associated with a webpage from a webserver, wherein the user action corresponds to at least one of a selection of a hyperlink or an entry of a URL into a browser,
wherein to receive the machine-readable file, the one or more processors are configured to receive the machine-readable file based on receiving the content.

Clause 50. The system of any of Clauses 34 to 49, wherein the machine generated file comprises an HTML file.

Clause 51. The system of any of Clauses 34 to 50, wherein the one or more processors are further configured to identify one or more resource access instructions associated with the plurality of instructions, wherein the one or more resource access instructions comprise at least one of a preload, a preconnect, or DNS-prefetch.

Clause 52. The system of any of Clauses 34 to 51, wherein the one or more processors are further configured to identify one or more resource access instructions associated with the plurality of instructions, wherein the one or more resource access instructions comprise an instruction to download a particular resource.

Clause 53. The system of any of Clauses 34 to 52, wherein the one or more processors are further configured to identify one or more resource access instructions associated with the plurality of instructions, wherein the one or more resource access instructions comprise an instruction to make a HTTP connection to a particular domain.

Clause 54. The system of any of Clauses 34 to 53, wherein the one or more processors are further configured to identify one or more resource access instructions associated with the plurality of instructions, wherein the one or more resource access instructions comprise an instruction to make a HTTP connection to a particular domain, wherein to make the HTTP connection to the particular domain comprises making a DNS lookup, making a TCP connection, and negotiating a secure TLS connection.

Clause 55. The system of any of Clauses 34 to 54, The system of any of Clauses 34 to 3, wherein the one or more processors are further configured to identify one or more resource access instructions associated with the plurality of instructions, wherein the one or more resource access instructions comprise an instruction to make a DNS lookup for a particular domain.

Clause 56. The system of any of Clauses 34 to 55, wherein to cause the browser to load the webpage, the one or more processors are configured to cause the browser to parse the plurality of instructions and communicate requests for resources identified by plurality of instructions.

Clause 57. The system of any of Clauses 34 to 56, wherein the one or more processors are further configured to:
parse tags and/or headers in the plurality of instructions;
identify at least one tag or header in the plurality of instructions that includes a resource access instruction.

Clause 58. The system of any of Clauses 34 to 57, wherein the one or more processors are further configured to:
identify the particular instructions that are associated with at least one of a <link rel> tag or a Link HTTP header.

Clause 59. The system of any of Clauses 34 to 58, wherein the one or more processors are further configured to:
identify the particular instructions that are associated with at least one of a <link rel="preload"> tag or a Link: . . . ; rel="preload" response header.

Clause 60. The system of any of Clauses 34 to 59, wherein the one or more processors are further configured to:
identify the particular instructions that are associated with at least one of a <link rel="preconnect"> tag or a Link: . . . ; rel="preconnect" response header.

Clause 61. The system of any of Clauses 34 to 60, wherein the one or more processors are further configured to:
identify the particular instructions that are associated with at least one of a <link rel="dns-prefetch"> tag or a Link: . . . ; rel="dns-prefetch" response header.

Clause 62. The system of any of Clauses 34 to 61, wherein the resource utilization data comprises timing information associated with content requests from the browser.

Clause 63. The system of any of Clauses 34 to 62, wherein the resource utilization data comprises an indication of one or more resources identifier in the plurality of instructions.

Clause 64. The system of any of Clauses 34 to 63, wherein the one or more processors are further configured to generate a second file based at least in part on the plurality of instructions and the identified one or more resource access faults, wherein the second file includes fewer resource access faults than the machine-readable file.

Clause 65. The system of any of Clauses 34 to 64, wherein the one or more processors are further configured to generate a second file based at least in part on the plurality of instructions and the identified one or more resource access faults, wherein the second file includes fewer resource access faults than the machine-readable file, wherein the second file includes a programming language different from that of the machine-readable file.

Clause 66. The system of any of Clauses 34 to 65, wherein the one or more processors are further configured to generate a second file based at least in part on the plurality of instructions and the identified one or more resource access faults, wherein the second file includes fewer resource access faults than the machine-readable file, wherein the second file includes a programming language that was used to generated the machine-readable file.

Clause 67. Non-transitory computer readable media comprising computer-executable instructions that, when executed by a computing system, cause the computing system to:
receive a machine-readable file, the machine-readable file comprising a plurality of instructions defining at least content and structure of a webpage;
cause a browser to load the webpage based at least in part on the machine-readable file;
determine resource utilization data associated with the load of the webpage;
identify one or more resource access faults associated with the machine-readable file based at least in part on the determined resource utilization and a resource access instruction policy;
for each of the one or more resource access faults, identify an instruction of the plurality of instructions that corresponds to the particular resource access fault; and
cause display of the one or more instructions.

Clause 68. The non-transitory computer readable media of Clause 67, wherein the computing system is further configured to:
identify existing resource access instructions within the plurality of instructions; and
determine recommended resource access instructions based at least in part on the resource utilization,
wherein the resource access instruction policy indicates to determine a resource access fault based at least in part on a difference between the existing resource access instructions and the recommended resource access instructions.

Clause 69. The non-transitory computer readable media of any of Clauses 67 to 68, wherein the resource access instruction policy indicates to determine a resource access fault based at least in part on a determination that a number of resource access instructions associated with the plurality of instructions satisfies a threshold, wherein the resource access instructions comprises at least one of a preload, preconnect, or a DNS-prefetch.

Clause 70. The non-transitory computer readable media of any of Clauses 67 to 69, wherein the resource access instruction policy indicates to determine a resource access fault based at least in part on a determination that the plurality of instructions is associated with a preload for secondary content.

Clause 71. The non-transitory computer readable media of any of Clauses 67 to 70, wherein the resource access instruction policy indicates to determine a resource access fault based at least in part on a determination that the plurality of instructions includes an individual instruction that is associated with multiple resource access instructions.

Clause 72. The non-transitory computer readable media of any of Clauses 67 to 71, wherein the resource access instruction policy indicates to determine a resource access fault based at least in part on an absence of a preload for a primary domain.

Clause 73. The non-transitory computer readable media of any of Clauses 67 to 72, wherein the resource access instruction policy indicates to determine a resource access fault based at least in part on a presence of a preconnect for an unused domain.

Clause 74. The non-transitory computer readable media of any of Clauses 67 to 73, wherein the resource access instruction policy indicates to determine a resource access fault based at least in part on a presence of a preconnect for a first domain and a determination that no requests by the browser were made to the first domain within a threshold amount of time.

Clause 75. The non-transitory computer readable media of any of Clauses 67 to 74, wherein the resource access instruction policy indicates to determine a resource access fault based at least in part on an absence of a DNS-prefetch for a first party domain.

Clause 76. The non-transitory computer readable media of any of Clauses 67 to 75, wherein the resource access instruction policy indicates to determine a resource access fault based at least in part on an absence of a DNS-prefetch for a third party domain.

Clause 77. The non-transitory computer readable media of any of Clauses 67 to 76, wherein the resource access instruction policy indicates to determine a resource access fault based at least in part on a determination that the webpage is accessed over HTTP/1.x and a determination that the plurality of instructions is not associated with a preload.

Clause 78. The non-transitory computer readable media of any of Clauses 67 to 77, wherein the resource access instruction policy indicates to determine a resource access fault based at least in part on a presence of a DNS-prefetch for an unused domain.

Clause 79. The non-transitory computer readable media of any of Clauses 67 to 78, wherein the resource access instruction policy indicates to determine a resource access fault based at least in part on a presence of a preconnect and a DNS-prefetch for the same domain.

Clause 80. The non-transitory computer readable media of any of Clauses 67 to 79, wherein the computing system is further configured to:
  identify existing resource access instructions within the plurality of instructions; and
  determine recommended resource access instructions based at least in part on the resource utilization; and
  wherein the resource access instruction policy indicates to determine a resource access fault based at least in part on a difference between the existing resource access instructions and the recommended resource access instructions.

Clause 81. The non-transitory computer readable media of any of Clauses 67 to 80, wherein the computing system is further configured to:
  request content associated with a webpage from a webserver,
  wherein to receive the machine-readable file, the computing system is configured to receive the machine-readable file based on receiving the content.

Clause 82. The non-transitory computer readable media of any of Clauses 67 to 81, wherein the computing system is further configured to:
  responsive to a user action, request content associated with a webpage from a webserver, wherein the user action corresponds to at least one of a selection of a hyperlink or an entry of a URL into a browser,
  wherein to receive the machine-readable file, the computing system is configured to receive the machine-readable file based on receiving the content.

Clause 83. The non-transitory computer readable media of any of Clauses 67 to 82, wherein the machine generated file comprises an HTML file.

Clause 84. The non-transitory computer readable media of any of Clauses 67 to 83, wherein the computing system is further configured to identify one or more resource access instructions associated with the plurality of instructions, wherein the one or more resource access instructions comprise at least one of a preload, a preconnect, or DNS-prefetch.

Clause 85. The non-transitory computer readable media of any of Clauses 67 to 84, wherein the computing system is further configured to identify one or more resource access instructions associated with the plurality of instructions, wherein the one or more resource access instructions comprise an instruction to download a particular resource.

Clause 86. The non-transitory computer readable media of any of Clauses 67 to 85, wherein the computing system is further configured to identify one or more resource access instructions associated with the plurality of instructions, wherein the one or more resource access instructions comprise an instruction to make a HTTP connection to a particular domain.

Clause 87. The non-transitory computer readable media of any of Clauses 67 to 86, wherein the computing system is further configured to identify one or more resource access instructions associated with the plurality of instructions, wherein the one or more resource access instructions comprise an instruction to make a HTTP connection to a particular domain, wherein to make the HTTP connection to the particular domain comprises making a DNS lookup, making a TCP connection, and negotiating a secure TLS connection.

Clause 88. The non-transitory computer readable media of any of Clauses 67 to 87, The non-transitory computer readable media of any of Clauses 67 to 3, wherein the computing system is further configured to identify one or more resource access instructions associated with the plurality of instructions, wherein the one or more resource access instructions comprise an instruction to make a DNS lookup for a particular domain.

Clause 89. The non-transitory computer readable media of any of Clauses 67 to 88, wherein to cause the browser to load the webpage, the computing system is configured to cause the browser to parse the plurality of instructions and communicate requests for resources identified by plurality of instructions.

Clause 90. The non-transitory computer readable media of any of Clauses 67 to 89, wherein the computing system is further configured to:
  parse tags and/or headers in the plurality of instructions;
  identify at least one tag or header in the plurality of instructions that includes a resource access instruction.

Clause 91. The non-transitory computer readable media of any of Clauses 67 to 80, wherein the computing system is further configured to:
  identify the particular instructions that are associated with at least one of a <link rel> tag or a Link HTTP header.

Clause 92. The non-transitory computer readable media of any of Clauses 67 to 91, wherein the computing system is further configured to:
  identify the particular instructions that are associated with at least one of a <link rel="preload"> tag or a Link: . . . ; rel="preload" response header.

Clause 93. The non-transitory computer readable media of any of Clauses 67 to 92, wherein the computing system is further configured to:
  identify the particular instructions that are associated with at least one of a <link rel="preconnect"> tag or a Link: . . . ; rel="preconnect" response header.

Clause 94. The non-transitory computer readable media of any of Clauses 67 to 93, wherein the computing system is further configured to:
  identify the particular instructions that are associated with at least one of a <link rel="dns-prefetch"> tag or a Link: . . . ; rel="dns-prefetch" response header.

Clause 95. The non-transitory computer readable media of any of Clauses 67 to 94, wherein the resource utilization data comprises timing information associated with content requests from the browser.

Clause 96. The non-transitory computer readable media of any of Clauses 67 to 95, wherein the resource utilization data comprises an indication of one or more resources identifier in the plurality of instructions.

Clause 97. The non-transitory computer readable media of any of Clauses 67 to 96, wherein the computing system is further configured to generate a second file based at least in part on the plurality of instructions and the identified one or more resource access faults, wherein the second file includes fewer resource access faults than the machine-readable file.

Clause 98. The non-transitory computer readable media of any of Clauses 67 to 97, wherein the computing system is further configured to generate a second file based at least in part on the plurality of instructions and the identified one or more resource access faults, wherein the second file includes fewer resource access faults than the machine-readable file, wherein the second file includes a programming language different from that of the machine-readable file.

Clause 99. The non-transitory computer readable media of any of Clauses 67 to 98, wherein the computing system is further configured to generate a second file based at least in part on the plurality of instructions and the identified one or more resource access faults, wherein the second file includes fewer resource access faults than the machine-readable file, wherein the second file includes a programming language that was used to generated the machine-readable file.

Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could." "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising." and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z." unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. In certain embodiments, one or more of the components described herein can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources.

When implemented as a cloud-based service, various components described herein can be implemented using containerization or operating-system-level virtualization, or other virtualization technique. For example, one or more components can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for identifying and indicating resource access faults associated with a webpage, the method comprising:
    receiving a machine-readable file, the machine-readable file comprising a plurality of instructions to access a plurality of resources to define at least content and structure of a webpage;
    identifying existing resource access instructions within the plurality of instructions;
    determining recommended resource access instructions;
    causing a browser to perform a load of the webpage based at least in part on the machine-readable file;
    determining that a subset of the plurality of resources are accessed by the browser for the load of the webpage;
    identifying a utilization of the subset of the plurality of resources by the browser to perform the load of the webpage based at least in part on determining that the subset of the plurality of resources are accessed by the browser for the load of the webpage, wherein the utilization of the subset of the plurality of resources indicates that a first resource of the subset of the plurality of resources is utilized to perform the load of the webpage and a second resource of the subset of the plurality of resources is unutilized to perform the load of the webpage;
    identifying one or more resource access faults associated with the subset of the plurality of resources based on the second resource being accessed and unutilized to perform the load of the webpage and a resource access instruction policy, wherein the one or more resource access faults are associated with the machine-readable file, wherein the resource access instruction policy indicates to determine a resource access fault based at least in part on a difference between the existing resource access instructions and the recommended resource access instructions;

for each particular resource access fault of the one or more resource access faults, identifying an instruction of the plurality of instructions that corresponds to the particular resource access fault; and causing display of the one or more instructions.

2. The method of claim 1, wherein determining the recommended resource access instructions comprises determining the recommended resource access instructions based at least in part on the utilization of the subset of the plurality of resources.

3. The method of claim 1, wherein the resource access instruction policy indicates to determine a resource access fault based at least in part on a determination that a number of resource access instructions associated with the plurality of instructions satisfies a threshold, wherein the resource access instructions comprises at least one of a preload, preconnect, or a DNS-prefetch.

4. The method of claim 1, wherein the resource access instruction policy indicates to determine a resource access fault based at least in part on a determination that the plurality of instructions is associated with a preload for secondary content.

5. The method of claim 1, wherein the resource access instruction policy indicates to determine a resource access fault based at least in part on a determination that the plurality of instructions includes an individual instruction that is associated with multiple resource access instructions.

6. The method of claim 1, wherein the resource access instruction policy indicates to determine a resource access fault based at least in part on an absence of a preload for a primary domain.

7. The method of claim 1, wherein the resource access instruction policy indicates to determine a resource access fault based at least in part on a presence of a preconnect for an unused domain.

8. The method of claim 1, wherein the resource access instruction policy indicates to determine a resource access fault based at least in part on a presence of a preconnect for a first domain and a determination that no requests by the browser were made to the first domain within a threshold amount of time.

9. The method of claim 1, wherein the resource access instruction policy indicates to determine a resource access fault based at least in part on an absence of a DNS-prefetch for a first party domain.

10. The method of claim 1, wherein the resource access instruction policy indicates to determine a resource access fault based at least in part on an absence of a DNS-prefetch for a third party domain.

11. The method of claim 1, wherein the resource access instruction policy indicates to determine a resource access fault based at least in part on a determination that the webpage is accessed over an HTTP protocol and a determination that the plurality of instructions is not associated with a preload.

12. The method of claim 1, wherein the resource access instruction policy indicates to determine a resource access fault based at least in part on a presence of a DNS-prefetch for an unused domain.

13. The method of claim 1, wherein the resource access instruction policy indicates to determine a resource access fault based at least in part on a presence of a preconnect and a DNS-prefetch for the same domain.

14. The method of claim 1, further comprising:

requesting content associated with a webpage from a webserver, wherein said receiving the machine-readable file is based on receiving the content.

15. The method of claim 1, further comprising:

responsive to a user action, requesting content associated with a webpage from a webserver, wherein the user action corresponds to at least one of a selection of a hyperlink or an entry of a URL into a browser, wherein said receiving the machine-readable file is based on receiving the content.

16. The method of claim 1, wherein the machine-readable file comprises an HTML file.

17. The method of claim 1, further comprising identifying one or more resource access instructions associated with the plurality of instructions, wherein the one or more resource access instructions comprise at least one of a preload, a preconnect, or DNS-prefetch.

18. A computing system comprising:

memory; and one or more processors coupled to the memory and configured to:

receive a machine-readable file, the machine-readable file comprising a plurality of instructions to access a plurality of resources to define at least content and structure of a webpage;

identify existing resource access instructions within the plurality of instructions;

determine recommended resource access instructions;

cause a browser to perform a load of the webpage based at least in part on the machine-readable file;

determine that a subset of the plurality of resources are accessed by the browser for the load of the webpage;

identify a utilization of the subset of the plurality of resources by the browser to perform the load of the webpage based at least in part on determining that the subset of the plurality of resources are accessed by the browser for the load of the webpage, wherein the utilization of the subset of the plurality of resources indicates that a first resource of the subset of the plurality of resources is utilized to perform the load of the webpage and a second resource of the subset of the plurality of resources is unutilized to perform the load of the webpage;

identify one or more resource access faults associated with the subset of the plurality of resources based on the second resource being accessed and unutilized to perform the load of the webpage and a resource access instruction policy, wherein the one or more resource access faults are associated with the machine-readable file, wherein the resource access instruction policy indicates to determine a resource access fault based at least in part on a difference between the existing resource access instructions and the recommended resource access instructions;

for each particular resource access fault of the one or more resource access faults, identify an instruction of the plurality of instructions that corresponds to the particular resource access fault; and cause display of the one or more instructions.

19. The system of claim 18, wherein the resource access instruction policy indicates to determine a resource access fault based at least in part on a determination that a number of resource access instructions associated with the plurality of instructions satisfies a threshold, wherein the resource access instructions comprises at least one of a preload, preconnect, or a DNS-prefetch.

20. Non-transitory computer readable media comprising computer-executable instructions that, when executed by a computing system, cause the computing system to:

receive a machine-readable file, the machine-readable file comprising a plurality of instructions to access a plurality of resources to define at least content and structure of a webpage;

identify existing resource access instructions within the plurality of instructions;

determine recommended resource access instructions;

cause a browser to perform a load of the webpage based at least in part on the machine-readable file;

determine that a subset of the plurality of resources are accessed by the browser for the load of the webpage;

identify a utilization of the subset of the plurality of resources by the browser to perform the load of the webpage based at least in part on determining that the subset of the plurality of resources are accessed by the browser for the load of the webpage, wherein the utilization of the subset of the plurality of resources indicates that a first resource of the subset of the plurality of resources is utilized to perform the load of the webpage and a second resource of the subset of the plurality of resources is unutilized to perform the load of the webpage;

identify one or more resource access faults associated with the subset of the plurality of resources based on the second resource being accessed and unutilized to perform the load of the webpage and a resource access instruction policy, wherein the one or more resource access faults are associated with the machine-readable file, wherein the resource access instruction policy indicates to determine a resource access fault based at least in part on a difference between the existing resource access instructions and the recommended resource access instructions;

for each particular resource access fault of the one or more resource access faults, identify an instruction of the plurality of instructions that corresponds to the particular resource access fault; and cause display of the one or more instructions.

\* \* \* \* \*